(12) United States Patent
 Na

(10) Patent No.: US 10,198,435 B2
(45) Date of Patent: Feb. 5, 2019

(54) APPARATUS AND METHOD FOR GENERATING TRANSLATION MODEL, APPARATUS AND METHOD FOR AUTOMATIC TRANSLATION

(71) Applicant: Samsung Electronics Co., Ltd., Suwon-si (KR)

(72) Inventor: Hwi Dong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 15/245,474

(22) Filed: Aug. 24, 2016

(65) Prior Publication Data

US 2017/0139905 A1    May 18, 2017

(30) Foreign Application Priority Data

Nov. 17, 2015 (KR) .................. 10-2015-0161411

(51) Int. Cl.
| | | |
|---|---|---|
| *G06F 17/28* | (2006.01) | |
| *G06F 17/27* | (2006.01) | |
| *G10L 15/00* | (2013.01) | |
| *G10L 15/16* | (2006.01) | |
| *G10L 15/26* | (2006.01) | |
| *G06N 3/08* | (2006.01) | |

(52) U.S. Cl.
CPC ...... *G06F 17/2836* (2013.01); *G06F 17/2735* (2013.01); *G06F 17/2818* (2013.01); *G06N 3/08* (2013.01); *G10L 15/005* (2013.01); *G10L 15/16* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,687,383 A | 11/1997 | Nakayama et al. | |
| 7,725,408 B2 | 5/2010 | Lee et al. | |
| 9,620,104 B2 * | 4/2017 | Naik | G10L 13/027 |
| 9,711,141 B2 * | 7/2017 | Henton | G10L 15/22 |
| 2009/0248422 A1 | 10/2009 | Li et al. | |
| 2010/0228548 A1 * | 9/2010 | Liu | G10L 15/065 |
| | | | 704/251 |
| 2011/0313762 A1 * | 12/2011 | Ben-David | G10L 13/08 |
| | | | 704/231 |

(Continued)

FOREIGN PATENT DOCUMENTS

| | | |
|---|---|---|
| JP | 8-101837 A | 4/1996 |
| JP | 2007-52700 A | 3/2007 |

(Continued)

*Primary Examiner* — Kevin Ky
(74) *Attorney, Agent, or Firm* — NSIP Law

(57) ABSTRACT

Disclosed herein are an apparatus and method for generating a translation model and an apparatus and method for automatic translation. A translation model generation apparatus and corresponding method include a learning data collector configured to collect an original text, an original text containing an error, and a translation of the original text as learning data, and a model generator that generates a translation model to simultaneously perform error correction and translation generation by enabling a neural network to learn based on the collected learning data.

26 Claims, 5 Drawing Sheets

(56) References Cited

U.S. PATENT DOCUMENTS

| | | | |
|---|---|---|---|
| 2015/0100314 A1* | 4/2015 | Phillips | G10L 15/30 704/235 |
| 2016/0092438 A1* | 3/2016 | Sonoo | G06F 17/289 704/2 |
| 2016/0321541 A1* | 11/2016 | Liu | G06N 3/0454 |
| 2017/0075883 A1* | 3/2017 | Kamatani | G06F 17/2836 |

FOREIGN PATENT DOCUMENTS

| KR | 10-0750886 B1 | 8/2007 |
|---|---|---|
| KR | 10-2014-0092960 A | 7/2014 |
| KR | 10-2015-0014236 A | 2/2015 |

* cited by examiner

APPARATUS AND METHOD FOR GENERATING TRANSLATION MODEL, APPARATUS AND METHOD FOR AUTOMATIC TRANSLATION

CROSS-REFERENCE TO RELATED APPLICATION(S)

This application claims the benefit under 35 USC 119(a) from Korean Patent Application No. 10-2015-0161411, filed on Nov. 17, 2015, in the Korean Intellectual Property Office, the disclosure of which is incorporated herein by reference in its entirety.

BACKGROUND

1. Field

The following description relates to an automatic translation apparatus and method to generate a translation model and an apparatus and method for automatic translation, all of which are robust to a voice recognition error.

2. Description of Related Art

Automatic translation may be classified into three processes, voice recognition, automatic translation, and voice synthesis. Because each process is consecutively performed, an error generated in a preceding process affects the following process. In a case of the voice recognition, because there may be various speech production forms depending on a user and a noise level may vary according to a surrounding environment when a voice is input, ways to effectively correspond to variations of the voice signal are required.

Furthermore, recently, voice recognition using mechanical learning has rapidly developed due to its capability to effectively correspond to various changes in a voice signal. However, the voice recognition using mechanical learning is still prone to a voice recognition error when a noise level is high or completely different words have similar pronunciations, such errors cause the quality of automatic translation to degrade.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with an embodiment, there is provided an apparatus and method to generate a translation model and an apparatus and method for automatic translation, all of which are robust to a voice recognition error.

In accordance with an embodiment, there is provided an apparatus to generate a translation model, the apparatus including: a learning data collector configured to collect an original text, an original text containing an error, and a translation of the original text as learning data; and a model generator configured to generate a translation model to simultaneously perform error correction and translation generation by enabling a neural network to learn based on the collected learning data.

The neutral network may include a first neutral network configured to convert the original text including an error into abstract information, a second neural network configured to generate the translation of the original text from the abstract information, and a third neural network configured to generate the original text from the abstract information.

The first neural network, the second neural network, and the third neural network may be configured as one deep neural network (DNN) to enable the one DNN to learn through one learning process.

The abstract information may be an embedding vector disposed on a multi-dimensional vector space.

The model generator may use a multi-task learning technique to enable the neural network to learn.

The model generator may enable the neural network to learn by setting the original text including an error as an input and setting the original text and the translation of the original text as targets.

In accordance with an embodiment, there is provided a method to generate a translation model, the method including: collecting an original text, an original text containing an error, and a translation of the original text as learning data; and generating a translation model to simultaneously perform error correction and translation generation by enabling a neural network to learn based on the collected learning data.

The neutral network may include a first neutral network configured to convert the original text including an error into abstract information, a second neural network configured to generate the translation of the original text from the abstract information, and a third neural network configured to generate the original text from the abstract information.

The generating of the translation model configures the first neural network, the second neural network, and the third neural network as one deep neural network (DNN) to enable the one DNN to learn through one learning process.

The abstract information may be an embedding vector disposed on a multi-dimensional vector space.

The generating of the translation model may use a multi-task learning technique to enable the neural network to learn.

The generating of the translation model may enable the neural network to learn by setting the original text including an error as an input and setting the original text and the translation of the original text as targets.

In accordance with another embodiment, there is provided an apparatus for automatic translation, including: a voice recognition processor configured to recognize an input voice; a translation processor configured to simultaneously perform voice recognition error correction and translation of the input voice to a voice recognition result using a translation model; and an transmitter configured to output a result of the voice recognition error correction and a result of the translation.

The translation model may be generated by enabling a neural network to learn based on an original text, an original text including an error, and a translation of the original text.

The translation model may be generated by enabling the neutral network to learn using a multi-task learning technique.

The translation model may be generated by enabling the neural network to learn by setting the original text including an error as an input and setting the original text and the translation of the original text as targets.

In accordance with a further embodiment, there is provided a method for automatic translation, the method including: recognizing an input voice; simultaneously performing voice recognition error correction and translation of the input voice to a voice recognition result using a translation model; and outputting a result of the voice recognition error correction and a result of the translation.

The translation model may be generated by enabling a neural network to learn based on an original text, an original text including an error, and a translation of the original text.

The translation model may be generated by enabling the neutral network to learn using a multi-task learning technique.

The translation model may be generated by enabling the neural network to learn by setting the original text including an error as an input and setting the original text and the translation of the original text as targets.

In accordance with another embodiment, there is provided an automatic translation apparatus, including: a processor configured to receive a voice from a user in a first language, perform voice recognition of the voice in the first language and generate a text in the first language as a voice recognition result, and translate the voice recognition result to a second language, configured to correct an error occurring in the voice recognition result using a translation model, and generate a translation in the second language simultaneously with the correction of the error.

The processor may include: a voice receiver configured to receive the voice from the user in the first language; a voice recognition processor configured to perform the voice recognition of the voice in the first language and generate the text in the first language as the voice recognition result; and a translation processor configured to translate the voice recognition result to the second language, configured to correct the error occurring in the voice recognition result using the translation model, and generate the translation in the second language simultaneously with the correction of the error.

The automatic translation apparatus may also include: a storage configured to store a sound model, a language model, and a pronunciation dictionary used in the voice recognition, and configured to store the translation model.

The voice recognition processor may recognize the input voice in the first language based on the sound model, the language model, and the pronunciation dictionary.

The translation model may be generated by teaching a neural network learning data including the text as an original text, an incorrect original text, and a translation of the original text.

The neural network may include a first neutral network that converts the original text including the error into abstract information, a second neural network that generates the translation of the original text based on the abstract information, and a third neural network that generates the original text by correcting an error based on the abstract information.

Other features and aspects will be apparent from the following detailed description, the drawings, and the claims.

Figure 1:
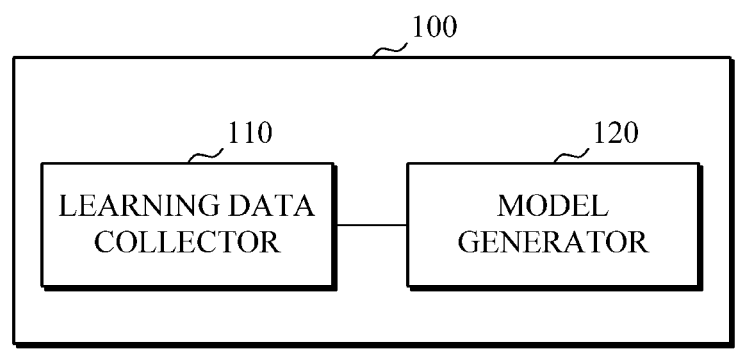
FIG. 1 is a block diagram illustrating a translation model generation apparatus that is robust to a voice recognition error, in accordance with an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram illustrating a translation model generation apparatus that is robust to a voice recognition error, in accordance with an embodiment. A translation model generation apparatus 100 is an apparatus that generates a translation model used in correcting a voice recognition error and simultaneously output a correct voice recognition result and a correct translation result in response to the voice recognition error detected in an automatic translation process.

Referring to FIG. 1, the translation model generation apparatus 100 includes a learning data collector 110 and a model generator 120.

The learning data collector 110 is a structural device, controller, or processor configured to collect an original text, an incorrect original text, and a translation of the original text as learning data. In an example, the incorrect original text refers to an original text containing an error.

The collected learning data is a bilingual corpus formed of a pair of the original text and the translation of the original text, and a monolingual corpus formed of a pair of the incorrect original text and the original text.

Furthermore, a method by which the learning data collector 110 collects the learning data is not particularly limited. That is, the learning data collector 110 may simply receive the original text, the incorrect original text, and the translation of the original text from an external device and collect them, or may also receive the original text and the translation of the original text from the outside and generate the incorrect original text by artificially inserting an error into the received original text. Furthermore, although the learning data collector 110 is illustrated and described as part of the translation model generation apparatus 100, the learning data collector 110 may be external to the translation model generation apparatus 100 to collect the original text, the incorrect original text, and the translation of the original text as the learning data and transmit the learned data to the translation model generation apparatus 100.

When generating the incorrect original text, the learning data collector 110 generates the incorrect original text by artificially inserting, adding, including, or incorporating a voice recognition error frequently occurring in a voice recognition process into the original text. For example, the learning data collector 110 generates the incorrect original text by changing a word, which is part of or encompasses the original text, to a word having a similar pronunciation as the voice recognition error. However, because such configuration of the learning data collector 110 is merely one embodiment, the present disclosure is not limited thereto, and the learning data collector 110 may generate the incorrect original text using various methods.

The model generator 120 is a processor or a controller configured to generate a translation model by training, teaching, using, or enabling a neural network to learn the collected learning data.

According to an embodiment, the neural network includes a first neural network, a second neural network, and a third neural network. In an example, the first neural network is a network that converts the incorrect original text into abstract information, the second neural network is a network that generates the translation of the original text based on the abstract information, and the third neural network is a network that generates the original text by correcting an error based on the abstract information.

In an embodiment, the abstract information may be expressed as an embedding vector. The embedding vector refers to showing an input value, such as a particular word, in a multi-dimensional vector form in which each of the dimensions has a real number value on a multi-dimensional vector space. One or more various attributes may correspond to a particular dimension of the vector, and a particular attribute may be expressed by being divided into one or more dimensions. By applying a multi-dimensional scaling (MDS) technique to distance matrices between words, the embedding vector is arranged as one point on the multi-dimensional embedding vector space.

According to an embodiment, the first neural network, the second neural network, and the third neural network may configure one deep neural network (DNN) by an output node of the first neural network being connected to input nodes of the second neural network and the third neural network. The model generator 120 trains, teaches, uses, or enables the first neural network, the second neural network, and the third neural network to learn, through one learning process, by configuring the three neural networks (the first neural network to the third neural network) as one network. In one example, the model generator 120 uses a multi-task learning technique to teach or train the neural network or to enable the neural network to learn. The multi-task learning technique is a method of learning to obtain various types of outputs with respect to one input. For example, the model generator 120 trains, teaches, uses, or enables the neural network to learn to generate a translation from the incorrect original text by setting the incorrect original text as an input to the neural network and setting the original text and the translation of the original text as targets so that translation generation and error correction may be simultaneously performed.

However, the present disclosure is not limited to the above described embodiment. In one embodiment, the first neural network is connected to the second neural network, the first neural network is connected to the third neural network, and each of the connections form a separate network. In this example, a network in which the first neural network and the second neural network are connected and a network in which the first neural network and the third neural network are connected may be configured, arranged, or enabled to learn separately, and may be integrated into one network.

The model generator 120 may repeatedly learn so that the incorrect original text approaches the original text or the translation of the original text through the abstract information. For example, the model generator 120 may use a back propagation technique, such as, a gradient descent algorithm, a stochastic gradient descent algorithm, etc., to allow the neural network to learn.

Figure 2:
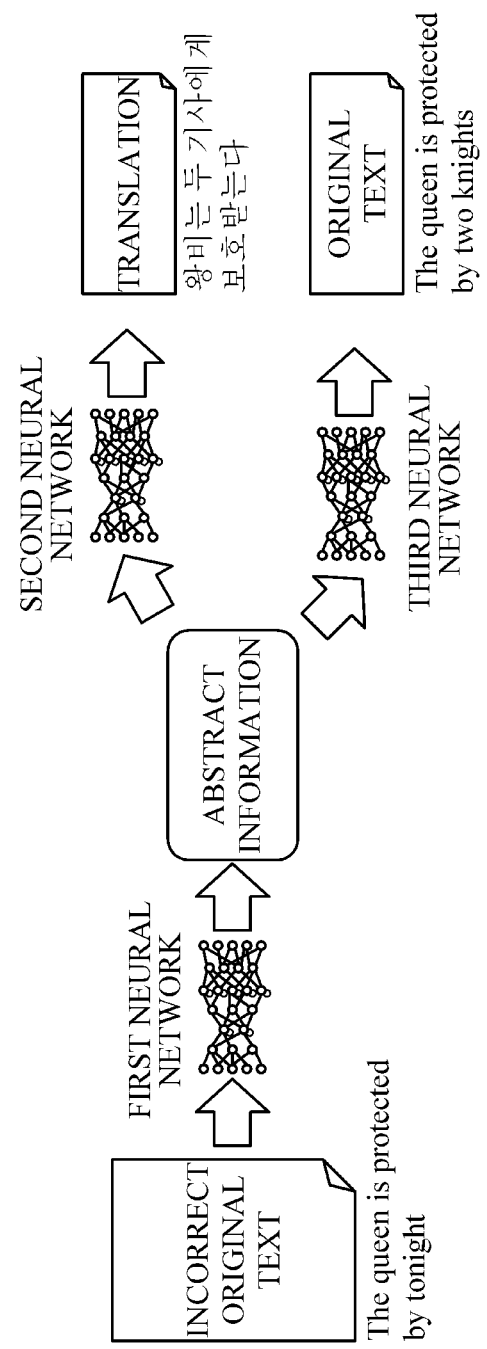
FIG. 2 is a view for describing neural network learning to generate a translation model, in accordance with an embodiment.

FIG. 2 is a view for describing neural network learning to generate a translation model, in accordance with an embodiment.

Referring to FIG. 2, the neural network may include the first neural network, the second neural network, and the third neural network. In an example, the first neural network is a network that converts the incorrect original text into abstract information, the second neural network is a network that generates the translation of the original text based on the abstract information, and the third neural network is a network that generates the original text by correcting an error based on the abstract information.

The learning data collector 110 collects an original text "The queen is protected by two knights," a translation of the original text "왕비는 두 기사에게 보호받는다," and an incorrect original text "The queen is protected by tonight."

The model generator 120 trains, teaches, or enables the first neural network and the second neural network to generate the correct translation "왕비는 두 기사에게 보호받는다" from the incorrect original text "The queen is protected by tonight," and trains, teaches, or enables the first neural network and the third neural network to learn to generate the (correct) original text "The queen is protected by two knights" from the incorrect original text "The queen is protected by tonight" using a multi-task learning technique.

In this process, the first neural network simultaneously restores the correct original text by correcting an error based on the incorrect original text and learns abstract information which generates a correct translation result.

Figure 3:
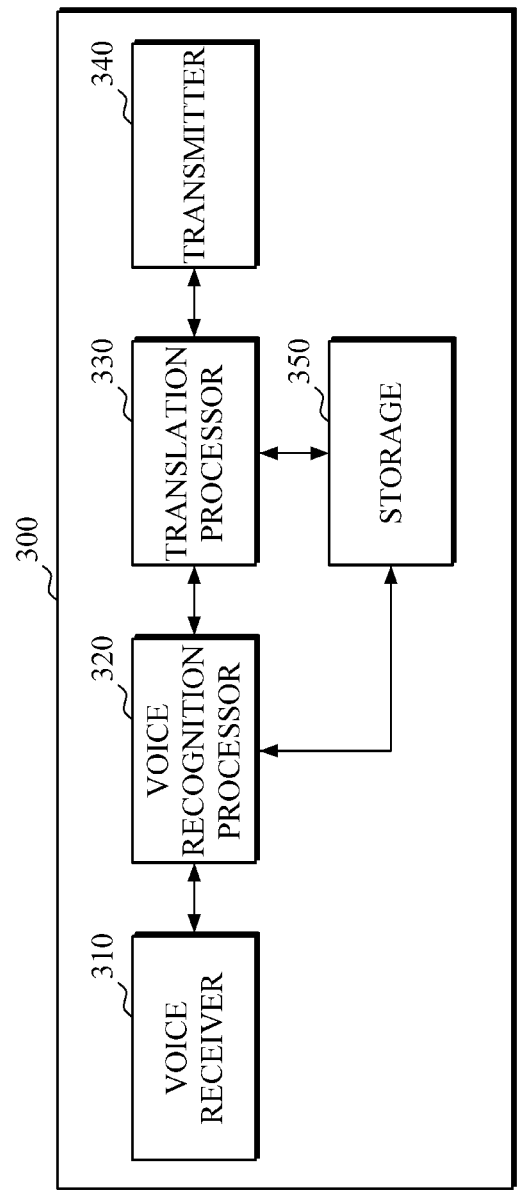
FIG. 3 is a block diagram illustrating an automatic translation apparatus that is robust to a voice recognition error, in accordance with an embodiment.

FIG. 3 is a block diagram illustrating an automatic translation apparatus that is robust to a voice recognition error, in accordance with an embodiment. According to an embodiment, an automatic translation apparatus 300 is an apparatus that translates a first language to a second language according to a user's request, and is an apparatus that uses the translation model generated by the translation model generation apparatus 100 of FIG. 1 to simultaneously perform correction and translation of a voice content using a voice recognition error generated in a translation process. In addition, the automatic translation apparatus 300 may be implemented with a structural module or manufactured in the form of a hardware chip and be embedded in an electronic apparatus. In one embodiment, the electronic apparatus includes a television (TV), a navigation processor, a vehicle electronic device, a smartphone, a tablet personal computer (PC), a smart watch, a desktop computer, a laptop, a wearable device, etc. but is not limited thereto.

Referring to FIG. 3, the automatic translation apparatus 300 includes a voice receiver 310, a voice recognition processor 320, a translation processor 330, a transmitter 340, and a storage 350.

The voice receiver 310 receives a user's voice in a first language as an input. In this example, the voice receiver 310 includes a microphone.

The voice recognition processor 320 performs voice recognition with respect to the input voice in the first language. For example, the voice recognition processor 320 recognizes the input voice in the first language based on a sound model, a language model, and a pronunciation dictionary and generates a text in the first language as a voice recognition result.

The translation processor 330 generates a translation in a second language by translating the text in the first language, generated as the voice recognition result, to the second language. The translation processor 330 corrects a voice recognition error using a translation model generated in advance. The translation processor 330 generates the translation in the second language simultaneously with the correction of the voice recognition error. In an alternative embodiment, translation processor 330 generates the translation in the second language after the correction of the voice recognition error.

In an embodiment, the translation model is generated by teaching or enabling a neural network to learn based on learning data, such as an original text, an incorrect original text, and a translation of the original text.

In an embodiment, the neural network includes a first neutral network that converts the original text containing an error into abstract information, a second neural network that generates the translation of the original text based on the abstract information, and a third neural network that generates the original text by correcting an error based on the abstract information. The abstract information may be expressed as an embedding vector.

According to an embodiment, the first neural network, the second neural network, and the third neural network may configure one DNN by an output node of the first neural network that is connected to input nodes of the second neural network and the third neural network, and the translation model is generated by teaching or enabling the one DNN to learn through one learning process.

The translation model is generated by teaching or enabling the neural network to learn using a multi-task learning technique. For example, the translation is generated by teaching or enabling the neural network to learn by setting the incorrect original text as an input and setting the original text and the translation of the original text as targets so that translation generation and error correction may be simultaneously performed.

The translation model is generated by teaching or enabling the neural network to repeatedly learn so that the incorrect original text approaches the original text or the translation of the original text through the abstract information. For example, the translation model is generated by enabling the neural network to learn using a back propagation technique, such as a gradient descent algorithm, a stochastic gradient descent algorithm, etc.

The transmitter 340 outputs a translation result and/or a voice recognition error correction result. According to an embodiment, the transmitter 340 outputs the translation result and/or the voice recognition error correction result using at least one method among an auditory method, a visual method, and a tactile method. For example, the transmitter 340 may output the translation result and/or the voice recognition error correction result using a voice, a text, vibration, etc.

The storage 350 stores a program for processing and controlling the automatic translation apparatus 300 and may store input/output data. For example, the storage 350 is a memory to store the sound model, the language model, and the pronunciation dictionary used in voice recognition, and stores the translation model used in correcting and translating a voice recognition error. In addition, the storage 350 stores a voice recognition result, a voice recognition error correction result, and a translation result, etc.

The storage 350 may include at least one type of a storage medium among a flash memory type, a hard disk type, a multimedia card micro type, a card type memory (e.g. a Secure Digital (SD) or an eXtreme Digital (XD) memory, etc.), a random access memory (RAM), a static RAM, a read-only memory (ROM), an electrically erasable programmable (EEP) ROM, a PROM, a magnetic memory, a magnetic disk, and an optical disk.

Although the storage 350 is illustrated and described to be part of the automatic translation apparatus 300, in an alternative configuration, the storage 350 may be an external device and may wirelessly or through connectors communicate with the voice recognition processor 320 and the translation processor 330.

Figure 4:
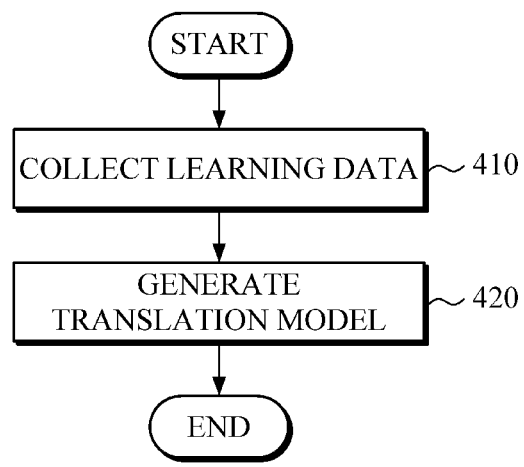
FIG. 4 is a flowchart illustrating a translation model generation method that is robust to a voice recognition error, in accordance with an embodiment.

FIG. 4 is a flowchart illustrating a translation model generation method that is robust to a voice recognition error, in accordance with an embodiment.

Referring to FIGS. 1 and 4, at operation 410, the translation model generation apparatus 100 collects an original text, an incorrect original text, and a translation of the original text as learning data. In an example, the incorrect original text refers to an original text containing an error.

The collected learning data may be a bilingual corpus formed of a pair of the original text and the translation of the original text, and a monolingual corpus formed of a pair of the incorrect original text and the original text.

Furthermore, a method by which the translation model generation apparatus collects the learning data is not particularly limited. That is, the translation model generation apparatus 100 may simply receive the original text, the incorrect original text, and the translation of the original text from an external device or source and collect the texts, or may also receive the original text and the translation of the original text from the external device or source and generate the incorrect original text by artificially inserting an error into the received original text.

When generating the incorrect original text, the translation model generation apparatus 100 generates the incorrect original text by artificially inserting a voice recognition error, frequently occurring in a voice recognition process, into the original text. For example, the translation model generation apparatus 100 generates the incorrect original text by changing a word that includes the original text to a word having a similar pronunciation.

At operation 420, the translation model generation apparatus 100 generates a translation model by allowing a neural network to learn the collected learning data.

The neural network includes a first neural network that converts the incorrect original text into abstract information, a second neural network that generates the translation of the original text based on the abstract information, and a third neural network that generates the original text by correcting an error based on the abstract information. In an example, the abstract information is expressed as an embedding vector.

According to an embodiment, the first neural network, the second neural network, and the third neural network may configure one DNN through an output node of the first neural network being connected to input nodes of the second neural network and the third neural network. The translation model generation apparatus 100 teaches or enables the first neural network, the second neural network, and the third neural network to learn through one learning process by configuring the three neural networks (the first neural network through the third neural network) as one network. In an example, the translation model generation apparatus 100 uses a multi-task learning technique to allow the neural network to learn. For example, the translation model generation apparatus 100 teaches or enables the neural network to learn by setting the incorrect original text as an input and setting the original text and the translation of the original text as targets so that translation generation and error correction may be performed simultaneously.

The translation model generation apparatus 100 repeatedly learns so that the incorrect original text approaches the original text or the translation of the original text through the abstract information. For example, the translation model generation apparatus 100 uses a typical back propagation technique, such as a gradient descent algorithm, a stochastic gradient descent algorithm, etc., to allow the neural network to learn.

Figure 5:
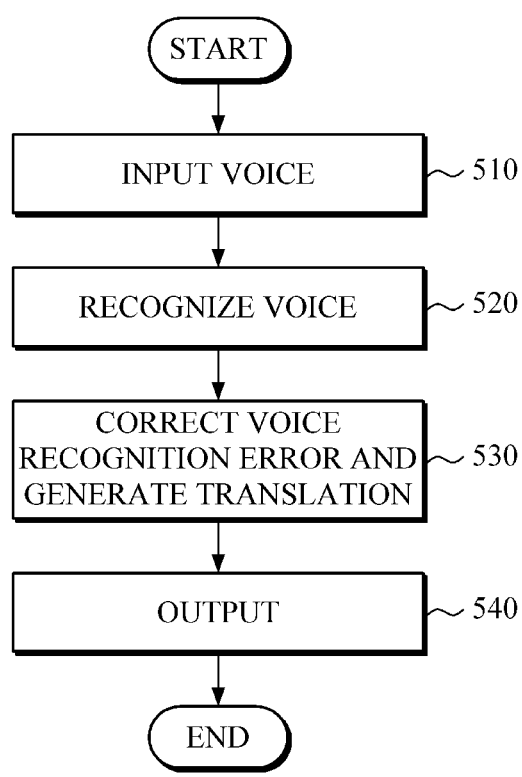
FIG. 5 is a flowchart illustrating an automatic translation method that is robust to a voice recognition error, in accordance with an embodiment.

FIG. 5 is a flowchart illustrating of an automatic translation method that is robust to a voice recognition error, in accordance with an embodiment.

Referring to FIGS. 3 and 5, at operation 510, the automatic translation apparatus 300 receives a user's voice in a first language as an input.

At operation 520, the automatic translation apparatus 300 performs or executes voice recognition with respect to the input voice in the first language. For example, the automatic translation apparatus 300 recognizes the input voice in the first language based on a sound model, a language model, and a pronunciation dictionary and generates a text in the first language as a voice recognition result.

At operation 530, the automatic translation apparatus 300 generates a translation in a second language by translating the text in the first language generated as the voice recognition result to the second language, and simultaneously corrects a voice recognition error using a translation model generated in advance.

The translation model may be generated by allowing the neural network to learn based on learning data, such as an original text, an incorrect original text, and a translation of the original text.

In an example, the neural network includes a first neutral network that converts the incorrect original text into abstract information, a second neural network that generates the translation of the original text based on the abstract information, and a third neural network that generates the original text by correcting an error based on the abstract information. The abstract information may be expressed as an embedding vector.

According to an embodiment, the first neural network, the second neural network, and the third neural network configure one DNN through an output node of the first neural network being connected to input nodes of the second neural network and the third neural network. The translation model is generated by teaching or enabling the one DNN to learn through one learning process.

The translation model is generated by teaching or enabling the neural network to learn using a multi-task learning technique. For example, the translation is generated by allowing the neural network to learn by setting the incorrect original text as an input and setting the original text and the translation of the original text as targets so that translation generation and error correction may be simultaneously performed.

The translation model is generated by teaching or enabling the neural network to repeatedly learn so that the incorrect original text approaches the original text or the translation of the original text through the abstract information. For example, the translation model is generated by teaching or enabling the neural network to learn using a typical back propagation technique, such as a gradient descent algorithm, a stochastic gradient descent algorithm, etc.

At operation 540, the automatic translation apparatus 300 outputs a translation result and/or a voice recognition error correction result. According to an embodiment, the automatic translation apparatus 300 outputs the translation result and/or the voice recognition error correction result by at least one method among an auditory method, a visual method, and a tactual method. For example, the automatic translation apparatus 300 outputs the translation result and/or the voice recognition error correction result using a voice, a text, or vibration.

The learning data collector 110, the model generator 120, the voice receiver 310, the voice recognition processor 320, the translation processor 330, the transmitter 340, and the storage 350 in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus to generate a trained translation model using a processor, the apparatus comprising:
the processor comprising:
a learning data collector configured to collect an original text, an original text containing an error, and a translation of the original text as learning data; and
a model generator configured to generate the trained translation model to simultaneously perform an automated correcting of an error in a speech recognition and perform translation generation of a recognized speech, the trained translation model being generated by enabling a neural network of the trained translation model to learn based on the collected learning data.

2. The apparatus of claim 1, wherein the neutral network of the trained translation model comprises a first neutral network configured to convert the original text including an error into abstract information, a second neural network configured to generate the translation of the original text from the abstract information, and a third neural network configured to generate the original text from the abstract information.

3. The apparatus of claim 2, wherein the first neural network, the second neural network, and the third neural network are configured as one deep neural network (DNN) to enable the one DNN to learn through one learning process.

4. The apparatus of claim 2, wherein the abstract information is an embedding vector disposed on a multi-dimensional vector space.

5. The apparatus of claim 1, wherein the model generator uses a multi-task learning technique to enable the neural network to learn.

6. The apparatus of claim 5, wherein the model generator enables the neural network to learn by setting the original text including an error as an input and setting the original text and the translation of the original text as targets.

7. A processor-implemented method of generating a trained translation model, the method comprising:
collecting an original text, an original text containing an error, and a translation of the original text as learning data; and
generating the trained translation model by enabling a neural network of the trained translation model to learn based on the collected learning data, the trained translation model being used to simultaneously perform an automated correcting of an error occurring in a speech recognition and perform translation of a recognized speech.

8. The method of claim 7, wherein the neutral network of the trained translation model comprises a first neutral network configured to convert the original text including an error into abstract information, a second neural network configured to generate the translation of the original text from the abstract information, and a third neural network configured to generate the original text from the abstract information.

9. The method of claim 8, wherein the generating of the trained translation model configures the first neural network, the second neural network, and the third neural network as one deep neural network (DNN) to enable the one DNN to learn through one learning process.

10. The method of claim 8, wherein the abstract information is an embedding vector disposed on a multi-dimensional vector space.

11. The method of claim 7, wherein the generating of the trained translation model uses a multi-task learning technique to enable the neural network to learn.

12. The method of claim 11, wherein the generating of the trained translation model enables the neural network to learn by setting the original text including an error as an input and setting the original text and the translation of the original text as targets.

13. An apparatus for automatic translation, comprising:
a voice recognition processor configured to recognize an input voice;
a translation processor configured to simultaneously perform an automated correcting of an error in the recognizing and perform translation of the input voice to a voice recognition result using a pre-trained translation model; and
a processor configured to indicate a result of the automated correcting of the error and a result of the translation.

14. The apparatus of claim 13, wherein the pre-trained translation model is in advance generated by enabling a neural network to learn based on an original text, an original text including an error, and a translation of the original text.

15. The apparatus of claim 14, wherein the pre-trained translation model is in advance generated by enabling the neutral network to learn using a multi-task learning technique.

16. The apparatus of claim 15, wherein the pre-trained translation model is in advance generated by enabling the neural network to learn by setting the original text including an error as an input and setting the original text and the translation of the original text as targets.

17. A processor-implemented method for automatic translation, the method comprising:
recognizing an input voice;
simultaneously performing an automated correcting of an error in the recognizing and performing translation of the input voice to a voice recognition result using a pre-trained translation model; and
indicating a result of the automated correcting of the error and a result of the translation.

18. The method of claim 17, wherein the pre-trained translation model is in advance generated by enabling a neural network to learn based on an original text, an original text including an error, and a translation of the original text.

19. The method of claim 18, wherein the pre-trained translation model is in advance generated by enabling the neutral network to learn using a multi-task learning technique.

20. The method of claim 18, wherein the pre-trained translation model is in advance generated by enabling the neural network to learn by setting the original text including an error as an input and setting the original text and the translation of the original text as targets.

21. An automatic translation apparatus, comprising:
a processor configured to
receive a voice from a user in a first language,
perform voice recognition of the voice in the first language and generate a text in the first language as a voice recognition result,
translate the voice recognition result to a second language, performing an automated correcting of an error occurring in the voice recognition result using a pre-trained translation model, and generate a translation in the second language, using the pre-trained translation model, simultaneously with the automated correcting of the error.

22. The automatic translation apparatus of claim 21, wherein the processor comprises:

a voice receiver configured to receive the voice from the user in the first language;

a voice recognition processor configured to perform the voice recognition of the voice in the first language and generate the text in the first language as the voice recognition result; and a translation processor configured to:

translate the voice recognition result to the second language, perform the automated correcting of the error occurring in the voice recognition result using the pre-trained translation model, and generate the translation in the second language, using the pre-trained translation model, simultaneously with the automated correcting of the error.

23. The automatic translation apparatus of claim 22, wherein the pre-trained translation model is in advance generated by teaching a neural network learning data, the learning data including an original text, an incorrect original text, and a translation of the original text, the incorrect original text being the original text including the error.

24. The automatic translation apparatus of claim 23, wherein the neural network comprises a first neutral network that converts the incorrect original text into abstract information, a second neural network that generates the translation of the original text based on the abstract information, and a third neural network that generates the original text by correcting an error based on the abstract information.

25. The automatic translation apparatus of claim 21, further comprising:

a storage configured to store a sound model, a language model, and a pronunciation dictionary used in the voice recognition, and configured to store the pre-trained translation model.

26. The automatic translation apparatus of claim 25, wherein the voice recognition processor recognizes the input voice in the first language based on the sound model, the language model, and the pronunciation dictionary.

* * * * *